United States Patent

Priesnitz et al.

[11] Patent Number: 5,830,304
[45] Date of Patent: Nov. 3, 1998

[54] METHOD FOR PRODUCING A TENSION-RESISTANCE CORE ELEMENT FOR A CABLE

[75] Inventors: Ulrich Priesnitz, Coburg; Harald Hanft, Sonnefeld; Rainer Raedisch, Kronach, all of Germany

[73] Assignee: Siemens Aktiengesellschaft, Munich, Germany

[21] Appl. No.: 838,171

[22] Filed: Apr. 16, 1997

Related U.S. Application Data

[63] Continuation of Ser. No. 491,596, Jun. 16, 1995, abandoned.

[30] Foreign Application Priority Data

Jun. 17, 1994 [DE] Germany .................. 44 21 184.8

[51] Int. Cl.$^6$ .............................. B29C 47/00; G02B 6/44
[52] U.S. Cl. ........................ 156/166; 156/172; 156/180; 156/244.12; 156/244.24; 156/308.2; 264/1.28; 264/171.18
[58] Field of Search .................... 156/166, 180, 156/244.12, 244.24, 308.2, 309.6, 308.9, 172, 441; 264/1.28, 1.29, 171.18, 176.1, 177.19, 272.11, 171.13, 171.17

[56] References Cited

U.S. PATENT DOCUMENTS

| | | | |
|---|---|---|---|
| 3,355,567 | 11/1967 | Holliday | 156/309.6 |
| 4,058,581 | 11/1977 | Park | 156/166 |
| 4,457,583 | 7/1984 | Mayr et al. | |
| 4,585,407 | 4/1986 | Silver et al. | 264/171.18 |
| 4,883,552 | 11/1989 | O'Connor et al. | 156/180 |
| 4,956,039 | 9/1990 | Olesen et al. | 156/166 |
| 5,283,014 | 2/1994 | Oestreich et al. | 156/172 |
| 5,328,493 | 7/1994 | Roncato et al. | |

FOREIGN PATENT DOCUMENTS 0 505 275  9/1992  European Pat. Off. .

OTHER PUBLICATIONS

Solventless Fabrication of Reinforced Composites, NASA Tech Briefs, Fall 1982.

*Primary Examiner*—Richard Crispino
*Attorney, Agent, or Firm*—Hill & Simpson

[57] ABSTRACT

An apparatus and process for obtaining the desired outside diameter for a tension-resistant core element, which includes assembling mixed filaments containing glass fibers and thermoplastic fibers, heating the bundle of mixed filaments to melt the thermoplastic fibers to form a matrix with the glass fibers embedded therein, then extruding an outer covering of the desired outside diameter for the core element onto the bundle. If desired, the melted bundle can be passed through a shaping device, which is preferably heated prior to extruding the coating thereon, and, subsequent to extruding, the extruded coating and bundle are cooled in the cooling device before being wound on a take-up drum or entering a stranding device for having communication elements stranded thereon.

5 Claims, 1 Drawing Sheet

METHOD FOR PRODUCING A TENSION-RESISTANCE CORE ELEMENT FOR A CABLE

This is a continuation of application Ser. No. 08/491,596, filed Jun. 16, 1995, now abandoned.

BACKGROUND OF THE INVENTION

The present invention is directed to a process for producing a tension-resistant core element for a cable, wherein glass fibers and thermoplastic fibers are fed in the form of a mixed filament to a heating device by which the thermoplastic fibers are molded to form a compact bundle in which the glass fibers are embedded.

For producing a central element for a cable, it is known from U.S. Pat. No. 4,457,583, whose disclosure is incorporated herein by reference thereto and which claims priority from German Application 30 24 310, to use a glass yarn which is encapsulated in a slow-curing resin. On the outside, a protective covering is extruded around a matrix thus formed and, within this covering, the curing of the resin can take place.

U.S. Pat. No. 5,328,493, whose disclosure is incorporated herein by reference thereto and which claims priority from the same French Application as European Published Application 0 505 275, discloses mixed filaments which contain individual threads of a thermoplastic material and also glass threads serving for reinforcement. Melting the plastic material produces a matrix in which the glass fibers are embedded.

Cable cores of electrical and/or optical cable generally contain a predetermined number of transmission elements and, therefore, with a view to obtain a desired distribution of conductors, a certain predetermined diameter becomes necessary for the core element. If there is a core element of a smaller diameter, which is, in fact, adequate for tension-resistance, this element is subsequently thickened to the desired outside diameter by applying an outer covering. This usually constitutes a relatively elaborate additional operation. In addition, the difficulty often arises that good adhesion between the tension-resistant element inside and the outer covering applied thereupon is not reached in many cases to the desired extent. This may be disadvantageous, for example with regard to the required longitudinal water-tightness of the cables.

SUMMARY OF THE INVENTION

The present invention is based on the object of presenting a method in which a desired thickening can be carried out on the core element of a cable in a simple and reliable manner. This object is obtained by an improvement in a process of producing a tension-resistant core element for a cable, wherein glass fibers and thermoplastic fibers are fed in the form of mixed filaments to a heating device by which the thermoplastic fibers are melted to form a compact bundle in which the glass fibers are embedded. The improvements are that subsequent to the melting of the synthetic fibers, a thermoplastic outer covering is additionally applied by extrusion onto the compact bundle by means of an extruder, which covering produces the desired outside diameter for the core element.

Since both the thermoplastic fibers and the material of the outer covering are applied in one operation, an impermeable and secure application of the outer covering must be ensured in a simple manner. In addition, within the scope of the invention, the thickened core element can be produced in one operation, that is to say continuously.

The invention also relates to an apparatus for carrying out the process according to the invention, which apparatus is characterized in that a heating device or means is provided to which a mixed group of filaments, comprising glass fibers and thermoplastic fibers, is fed and in which a melting of the thermoplastic fibers occurs to embed the glass fibers into a matrix and in that, in a running-through direction downstream of the heating means, there is provided an extruder by which an outer covering is applied to the melted bundle.

Other advantages and features of the invention will be readily apparent from the following description of the preferred embodiments, the drawings and claims.

DESCRIPTION OF THE PREFERRED EMBODIMENTS

Figure 3:
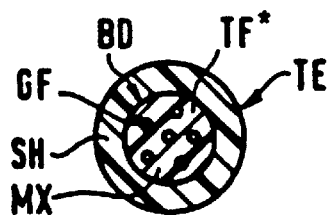
FIG. 3 is a transverse cross sectional view of a construction of a core element produced according to the present invention.

The principles of the present invention are particularly useful in forming a cable core, such as the core generally indicated at TE in FIG. 3.

Figure 1:
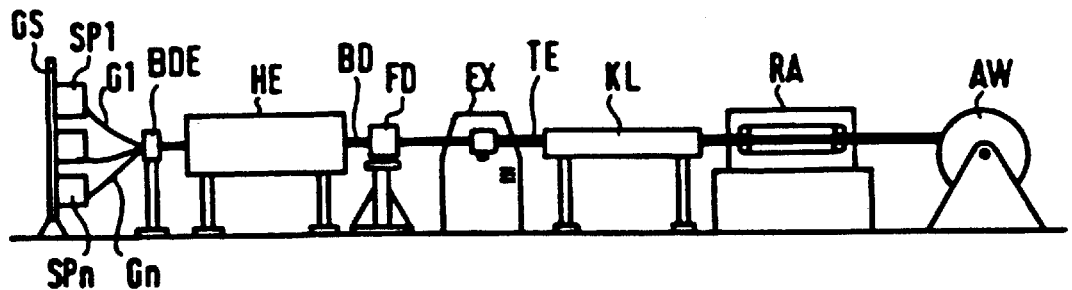
FIG. 1 is a diagrammatic presentation of an apparatus for carrying out the process according to the present invention.
Figure 2:
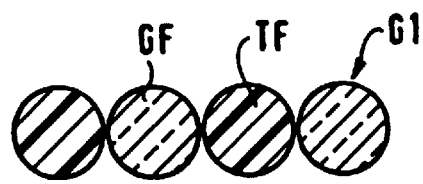
FIG. 2 is a transverse cross sectional view of individual elements of a mixed filament.

To form this core, an apparatus which includes a frame GS is provided, as illustrated in FIG. 1, and has a plurality of supply reels SP1–SPn. On these supply reels SP1–SPn, there are mixed filaments G1–Gn, which, as can be seen from FIG. 2, in each case contain a number of thermoplastic fibers TF and, furthermore, a number of tension-resistant glass fibers GF. The number and distribution of the glass fibers GF and of the synthetic or thermoplastic fibers TF may be chosen in any desired way. In general, however, the glass fibers GF and the synthetic fibers TF run substantially parallel in straight lines or rovings. The number of supply reels SP1–SPn used in each case essentially depends on the desired thickness of the tensions-resistant inner part of a core element, in the case of a correspondingly greater thickness there also has to be provided a correspondingly greater number of supply reels, such as SP1–SPn.

The individual mixed filaments G1–Gn are fed to a bundling device BDE, whereupon the loose overall bundle is obtained and is then introduced into a heating device HE. This heating device is dimensioned so that the respective synthetic fibers TF melt, with the result that a compact bundle BD, generally illustrated in FIG. 3, is produced. This bundle BD comprises a matrix MX of polymer material TF*, which is the melted synthetic fibers TF and in which the individual glass fibers GF are embedded. The bundle BD thus obtained is fed to a shaping die FD, which gives the bundle BD the desired outer, preferably round, shape, which round shape is generally taken as a basis for the core.

The compact bundle BD thus obtained has a diameter which generally does not correspond to the desired diameter of the core element, for example for a stranding structure of a core element. In order to achieve the desired thickening of the bundle, there is provided, as illustrated in FIG. 1, an extruder EX into which the bundle BD is fed expediently while still in the softest and hottest possible form. Thus, on entering the extruder EX, the bundle BD should have at least a higher temperature than that of room temperature. By means of an extruder EX, as can be seen from FIG. 3, a preferably round outer covering SH is applied to the bundle BD with an outside diameter of the covering SH chosen so that the core element TE obtained in this manner has the desired outside diameter.

It is expedient if the extruder EX is used to apply an outer covering SH which mechanically bonds as well as possible with the material of the thermoplastic fiber TF*. It is expedient if, as far as possible, the same or relative materials are used for the outer covering SH and the synthetic fibers TF, because then the adhesion is improved. For example, polyethylenes or polypropylenes or other plastics which ensure mutual adhesion which is good and as free from gaps as possible may be used in both cases. This close, good adhesion is also promoted by the elevated temperature at which the compact bundle BD enters the extruder EX.

For this purpose, the shaping die FD is expediently heated, which, on the one hand, contributes to the bundle BD being able to be brought easily into the desired shape and also ensures an elevated temperature of the bundle as it enters the extruder EX.

The now finished core element TE is brought to the desired outside diameter and is then introduced into a cooling device KL and drawn by means of a corresponding conveying device, for example a caterpillar puller RA, through the finishing device located to the left thereof.

Figure 4:
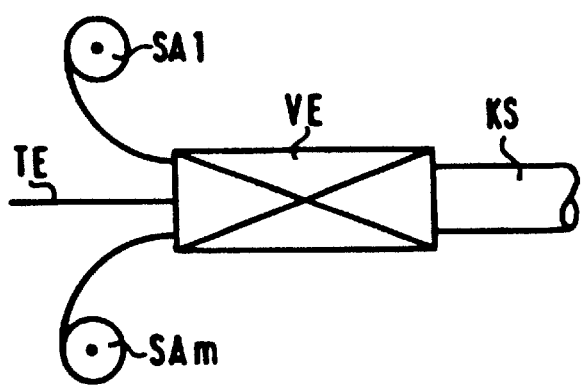
FIG. 4 is a diagrammatic view of a stranding device which may be integrated into the production process according to FIG. 1.

It is possible to keep the core element TE stored and, for this purpose, to wind it up, for example onto a take-up drum AW. It is also possible, however, as represented in FIG. 4, to allow the finished thickened core element TE to run, for example, into a stranding device VE, where insulated electrical conductors and/or buffered optical fibers SA1–SAm are stranded in one or more layers onto the core element TE, which will result in a cable core KS of the cable, preferably of a communication cable, being produced. By means of an extruded (not represented in any more detail here), the outer sheath of the cable can then be applied to the cable core KS in the same operation.

Although various minor modifications may be suggested by those versed in the art, it should be understood that we wish to embody within the scope of the patent granted hereon all such modifications as reasonably and properly come within the scope of our contribution to the art.

We claim:

1. A process for producing a tension-resistant core element for a cable comprising the steps of providing glass fibers and thermoplastic fibers from supply reels in a form of a group of mixed filaments, bundling the group to form a bundle of the mixed filaments, heating the bundle of mixed filaments to melt the thermoplastic fibers to form a compact bundle with the glass fibers embedded in a thermoplastic matrix material, heating a shaping die to an elevated temperature, then shaping the compact bundle in the heated shaping die to from a reshaped bundle with a desired outer contour, maintaining the reshaped bundle at an elevated temperature to keep the thermoplastic matrix material in the hottest and softest possible form, feeding the reshaped bundle with the matrix material in said form to an extruder, extruding a thermoplastic outer covering onto the reshaped bundle while the matrix material in the reshaped bundle is still in said form to form a covered bundle, said covering being made from a plastic material selected from a polyethylene and polypropylene and producing a desired outside diameter for the core element and having a gap-free and water-tight bond between the covering and the reshaped bundle and cooling said covered bundle in a subsequent cooling device.

2. A process according to claim 1, wherein the material of the outer covering is chosen to have properties similar to the properties of the material which forms the thermoplastic fibers.

3. A process according to claim 1, wherein the material of the outer covering is chosen to be the same as the material which forms the thermoplastic fibers.

4. A process according to claim 1, which includes, subsequent to the step of cooling, winding the core element onto a drum.

5. A process for producing a tension-resistant core element with at least a layer of stranded conductors for a cable comprising the steps of providing glass fibers and thermoplastic fibers from supply reels in a form of a group of mixed filaments, bundling the group to form a bundle of the mixed filaments, heating the bundle of mixed filaments to melt the thermoplastic fibers to form a compact bundle with the glass fibers embedded in a thermoplastic matrix material, heating a shaping die to an elevated temperature, then shaping the compact bundle in the heated shaping die to form a reshaped bundle with a desired outer contour, maintaining the reshaped bundle at an elevated temperature to keep the thermoplastic matrix material in the softest and hottest possible form, feeding the reshaped bundle with the matrix material in said form to an extruder, extruding a thermoplastic outer covering onto the reshaped bundle while the matrix material in the reshaped bundle is in said form to form a covered bundle, said covering being made from a plastic material selected from a polyethylene and polypropylene and producing a desired outside diameter for the core element and having a gap-free and water-tight bond between the covering and the reshaped bundle and cooling said covered bundle in a subsequent cooling device and then feeding the cooled covered bundle to a stranding device and stranding at least one layer of conductors selected from an electrical conductor and an optical fiber onto the cooled bundle.

* * * * *